United States Patent
Coyle et al.

(10) Patent No.: US 10,573,436 B2
(45) Date of Patent: Feb. 25, 2020

(54) LIQUID-TIGHT STRAIN RELIEF

(71) Applicant: Heyco Products Corp., Toms River, NJ (US)

(72) Inventors: William J. Coyle, Toms River, NJ (US); Daniel Finley, Beechwood, NJ (US)

(73) Assignee: Heyco Products Corp., Toms River, NJ (US)

( * ) Notice: Subject to any disclaimer, the term of this patent is extended or adjusted under 35 U.S.C. 154(b) by 48 days.

(21) Appl. No.: 15/702,733

(22) Filed: Sep. 12, 2017

(65) Prior Publication Data
US 2018/0151275 A1    May 31, 2018

Related U.S. Application Data

(63) Continuation-in-part of application No. 14/670,852, filed on Mar. 27, 2015, now Pat. No. 9,853,437.
(Continued)

(51) Int. Cl.
*H02G 3/22* (2006.01)
*H01B 17/58* (2006.01)
(Continued)

(52) U.S. Cl.
CPC ............ *H01B 17/586* (2013.01); *H01B 17/30* (2013.01); *H02G 3/22* (2013.01); *H02G 3/085* (2013.01);
(Continued)

(58) Field of Classification Search
CPC ...... H02G 3/22; H02G 15/013; H02G 15/007; H02G 3/085; F16L 37/0841
See application file for complete search history.

(56) References Cited

U.S. PATENT DOCUMENTS

2,424,757 A * 7/1947 Klumpp, Jr. .......... F16B 21/086
                                                  16/2.2
3,493,205 A * 2/1970 Bromberg ................ F16L 5/00
                                                  16/2.5
(Continued)

FOREIGN PATENT DOCUMENTS

WO    2005081374    1/2005

OTHER PUBLICATIONS

European Patent Office Communication dated Mar. 15, 2018, which issued from EP. Appln. No. 15718024.1, corresponding to U.S. Pat. No. 9,853,437, parent to this application.

*Primary Examiner* — David Bochna
(74) *Attorney, Agent, or Firm* — Gregory J. Gore, Esq.

(57) ABSTRACT

A liquid-tight strain relief includes a tubular-shaped bushing and a dome-shaped gland. The bushing includes a flange with arcuate slots, a centrally-located aperture, a plurality of resilient outer fingers, and a shoe slideably received within a lateral groove of the bushing. The gland includes a head having a centrally-located membrane. The head is co-molded with and encapsulates the flange, resulting in a strain relief having a unitary construction. The strain relief is adapted to be inserted within an orifice of a work piece, and the outer fingers frictionally engage the work piece. A cable is inserted within the strain relief by puncturing the membrane, which then stretches and provides a seal against the cable. The cable is gripped to the strain relief when the shoe is pressed against the cable. The shoe is held against the cable by teeth on the shoe, which engage opposing locking ribs on the bushing.

18 Claims, 12 Drawing Sheets

Related U.S. Application Data

(60) Provisional application No. 61/971,604, filed on Mar. 28, 2014.

(51) Int. Cl.
  *H01B 17/30* (2006.01)
  *H02G 3/08* (2006.01)
  *H02G 15/007* (2006.01)
  *H02G 15/013* (2006.01)

(52) U.S. Cl.
  CPC ......... *H02G 15/007* (2013.01); *H02G 15/013* (2013.01)

(56) References Cited

U.S. PATENT DOCUMENTS

| | | | | |
|---|---|---|---|---|
| 3,779,494 A * | 12/1973 | Nicholson | ............... | F16L 5/00 174/153 G |
| 3,788,582 A * | 1/1974 | Swanquist | ............... | H02G 3/0658 174/153 G |
| 3,836,269 A * | 9/1974 | Koscik | ............... | F16J 15/02 16/2.2 |
| 3,953,665 A * | 4/1976 | Nicholson | ............... | F16L 5/00 174/153 G |
| 4,000,875 A * | 1/1977 | Jemison | ............... | H02G 3/0625 174/153 G |
| 4,118,838 A * | 10/1978 | Schiefer | ............... | F16L 3/10 24/115 R |
| 4,407,042 A * | 10/1983 | Schramme | ............... | H02B 1/044 16/2.1 |
| 4,432,520 A * | 2/1984 | Simon | ............... | H02G 3/0658 174/153 G |
| 4,458,552 A * | 7/1984 | Spease | ............... | F16C 1/103 248/27.3 |
| 4,568,047 A * | 2/1986 | Matsui | ............... | H02G 3/083 174/153 G |
| 4,646,995 A * | 3/1987 | Matsui | ............... | H02G 3/0641 174/153 G |
| 4,888,453 A * | 12/1989 | Blasko | ............... | H02G 3/06 174/135 |
| 4,912,287 A * | 3/1990 | Ono | ............... | H02G 3/083 174/153 G |
| 4,913,385 A * | 4/1990 | Law | ............... | H01B 17/58 174/153 G |
| 5,149,026 A * | 9/1992 | Allen | ............... | F16L 3/227 248/68.1 |
| 5,161,428 A * | 11/1992 | Petruccello | ............... | F16C 1/226 192/111.12 |
| 5,243,139 A * | 9/1993 | Law | ............... | H02G 3/22 174/135 |
| 5,337,447 A * | 8/1994 | Tanaka | ............... | H02G 3/083 16/2.2 |
| 5,545,854 A * | 8/1996 | Ishida | ............... | H02G 3/081 16/2.2 |
| 5,911,790 A * | 6/1999 | Bates | ............... | F16C 1/103 74/502.4 |
| 5,954,345 A * | 9/1999 | Svoboda | ............... | F16H 57/029 16/2.3 |
| 7,126,064 B1 * | 10/2006 | Shemtov | ............... | H01R 13/5812 174/662 |
| 7,332,678 B2 * | 2/2008 | Pyron | ............... | B60R 16/0222 174/660 |
| 7,422,181 B2 * | 9/2008 | Süßenbach | ............... | F16L 3/10 174/664 |
| 7,582,836 B2 * | 9/2009 | Tapper | ............... | H02G 3/083 16/2.1 |
| 8,739,363 B2 * | 6/2014 | Allen | ............... | A61B 50/20 16/2.1 |

\* cited by examiner

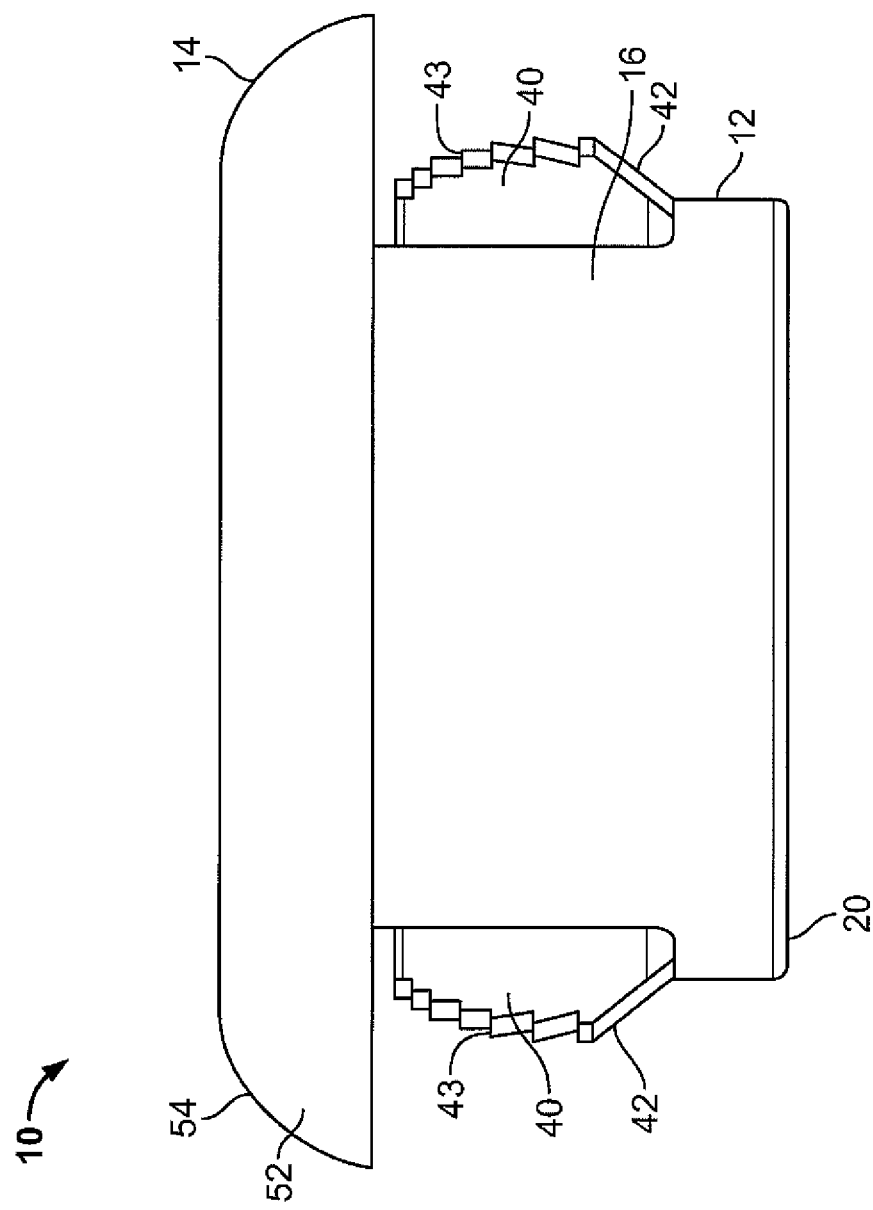

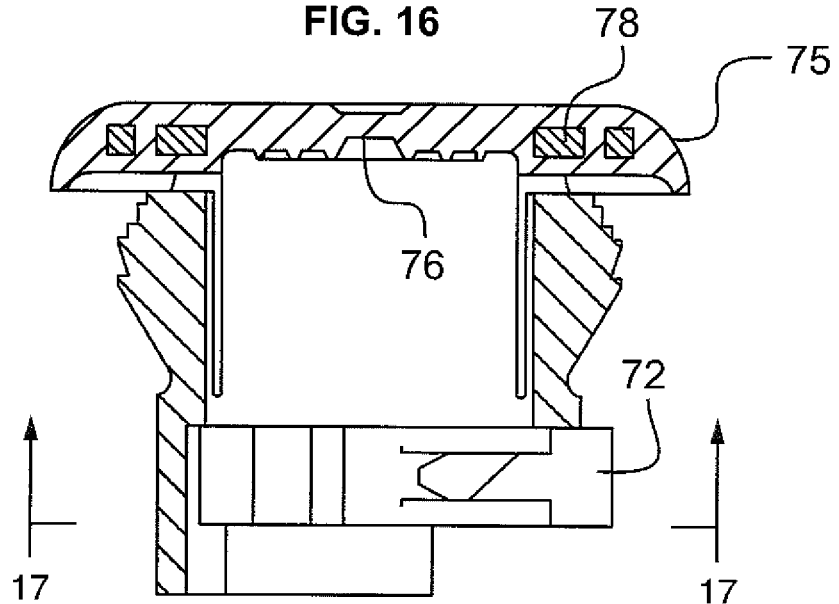
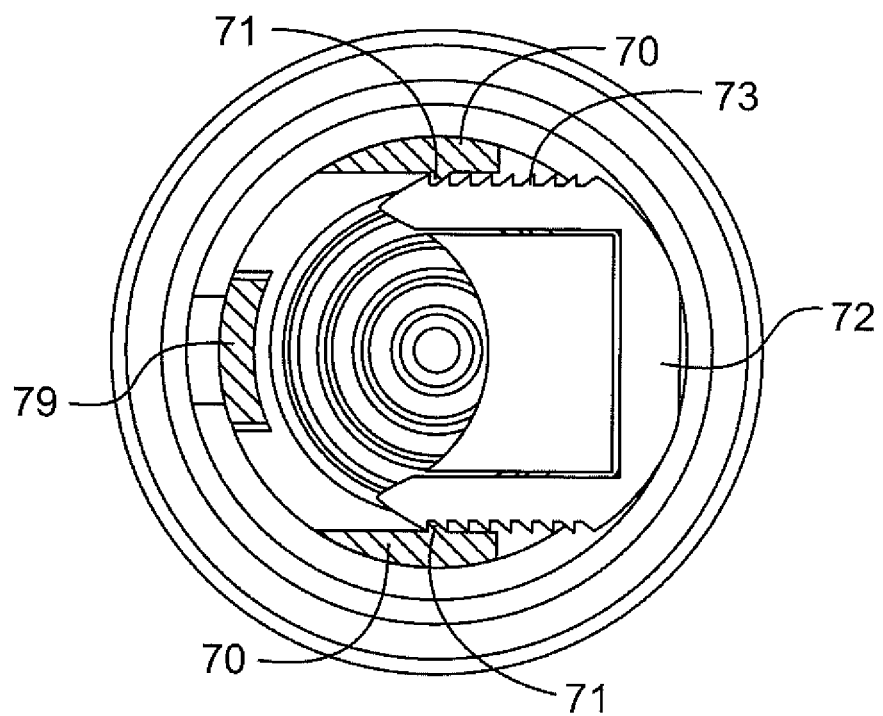

LIQUID-TIGHT STRAIN RELIEF

CROSS-REFERENCE TO RELATED APPLICATIONS

This application is a continuation-in-part of and claims priority to commonly owned co-pending U.S. patent application Ser. No. 14/670,852, filed Mar. 27, 2015, which is a nonprovisional patent application of and claims priority to commonly-owned, U.S. provisional patent application No. 61/971,604, filed Mar. 28, 2014, both of which are incorporated herein by reference in their entirety.

FIELD OF THE INVENTION

The present invention relates to a strain relief and, more particularly, to a liquid-tight, co-molded strain relief for cables, wires, tubing, rods and other elongated objects.

BACKGROUND OF THE INVENTION

Liquid-tight strain reliefs are affixed in a liquid-tight manner in orifices of work pieces. The liquid-tight strain reliefs enable cables, wires, tubing or rods to be passed through them in a locked and liquid tight engagement, while providing strain relief protection. Liquid-tight strain reliefs are described in U.S. Pat. Nos. 5,405,172 and 8,398,419, which are incorporated herein by reference in their entirety. Liquid-tight strain reliefs are also described in pending U.S. patent application Ser. No. 14/459,495, filed Aug. 14, 2014 and published as U.S. patent publication No. 2015/0048614 on Feb. 19, 2015, which is incorporated herein by reference in its entirety.

SUMMARY OF THE INVENTION

A liquid-tight strain relief includes a tubular-shaped bushing and a dome-shaped gland co-molded with the bushing. The bushing includes a flange, a centrally-located aperture, a plurality of resilient outer fingers, and a plurality of resilient inner fingers extending from an inner wall and positioned within the aperture. The gland includes a head having a centrally-located membrane. The head of the gland is co-molded with and encapsulates the flange of the bushing, thereby resulting in a strain relief having a unitary construction. The strain relief is inserted within an orifice of a work piece, such as a panel, and the outer fingers frictionally engage the work piece. A cable is inserted within the strain relief by piercing the membrane, which stretches and provides a seal against the cable. The cable is inserted through the aperture of the bushing and the resilient inner fingers of the bushing flex outwardly to enable the cable to pass through, while engaging and digging into the cable to clasp it and provide strain relief. In an alternate embodiment the inner fingers are replaced by a laterally moveable shoe which is manually pressed against the cable to clasp it. The cable-gripping shoe is slideably received within a lateral recess of the bushing. The gland includes a head having an outer surface, an inner surface, an annular interior portion located within said inner surface and encapsulating said annular flange of the bushing, and a central area of reduced thickness to facilitate the puncturing of the gland by the cable upon insertion.

BRIEF DESCRIPTION OF THE DRAWINGS

FIG. 4 is a side elevational view of the liquid-tight strain relief shown in FIG. 1;

FIG. 16 is a side cross-sectional view of the embodiment shown in FIG. 15; and,

FIG. 17 is a top cross-sectional view taken along line 17-17 and looking in the direction of the arrows of the strain relief shown in FIG. 16.

DETAILED DESCRIPTION OF PREFERRED EMBODIMENTS

Referring to FIGS. 1 through 7, in an embodiment, a liquid-tight strain relief 10 includes a tubular-shaped bushing 12 and a dome-shaped gland 14 attached to the bushing 12. In an embodiment, the gland 14 is co-molded with the bushing 12 in a manner that will be described hereinafter. In an embodiment, the bushing 12 is made from a thermoplastic material, while the gland 14 is made from a thermoplastic elastomer (TPE). In other embodiments, the bushing 12 and the gland 14 may be made from other suitable materials known in the art.

Figure 1:
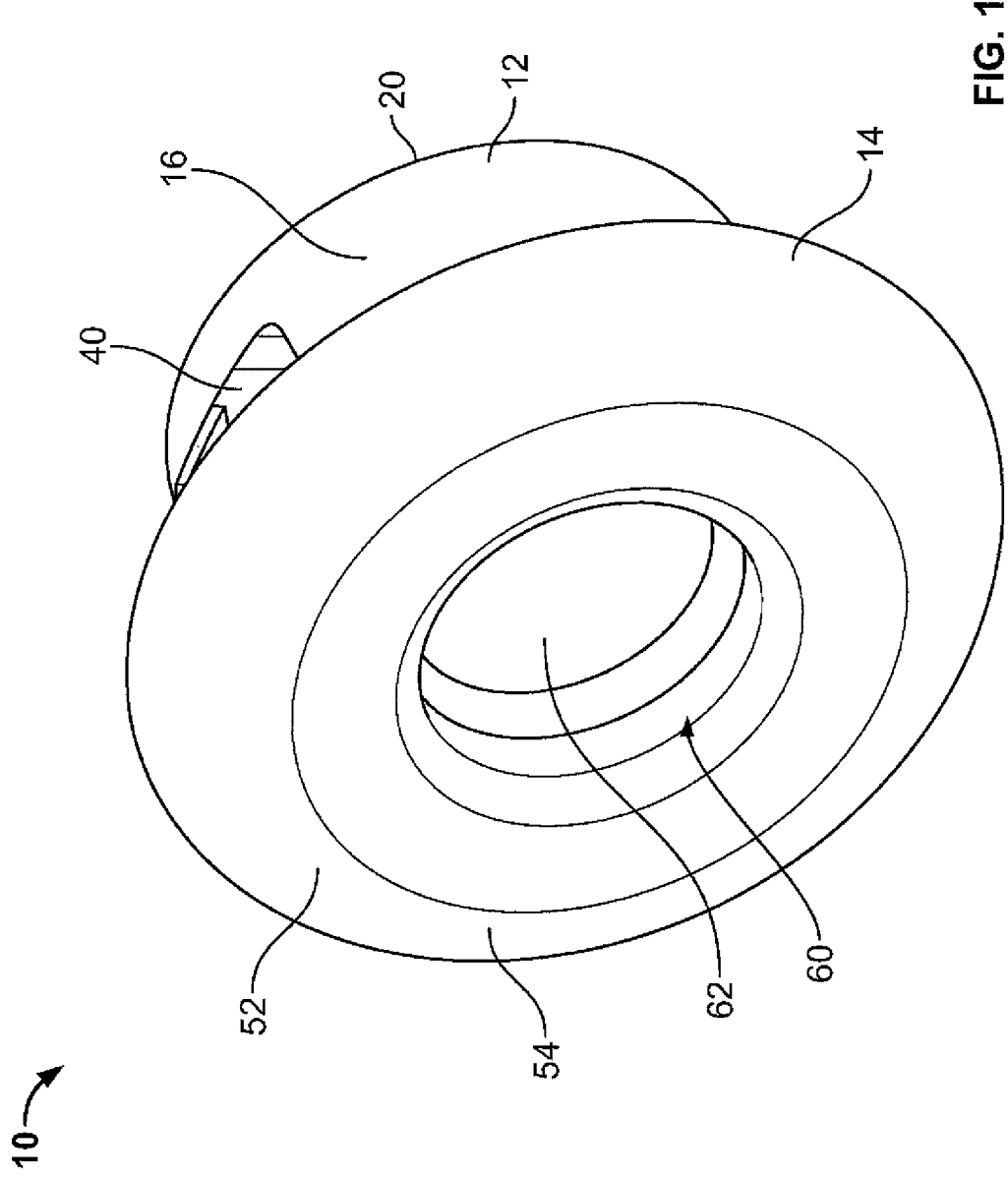
FIG. 1 is a top perspective view of a liquid-tight strain relief constructed in accordance with an embodiment of the invention.
Figure 3:
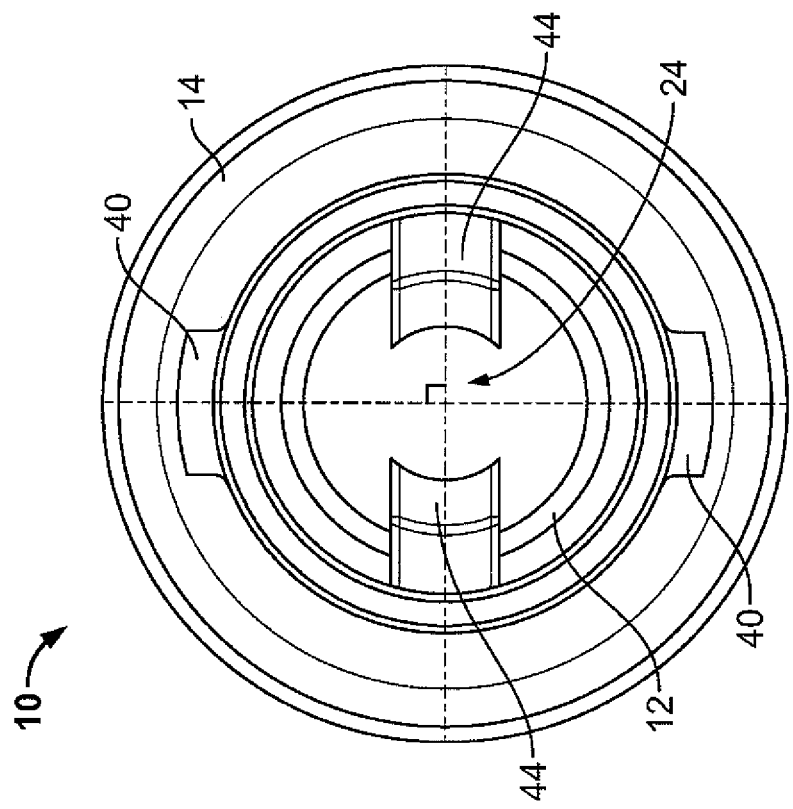
FIG. 3 is a bottom plan view of the liquid-tight strain relief shown in FIG. 1.
Figure 2:
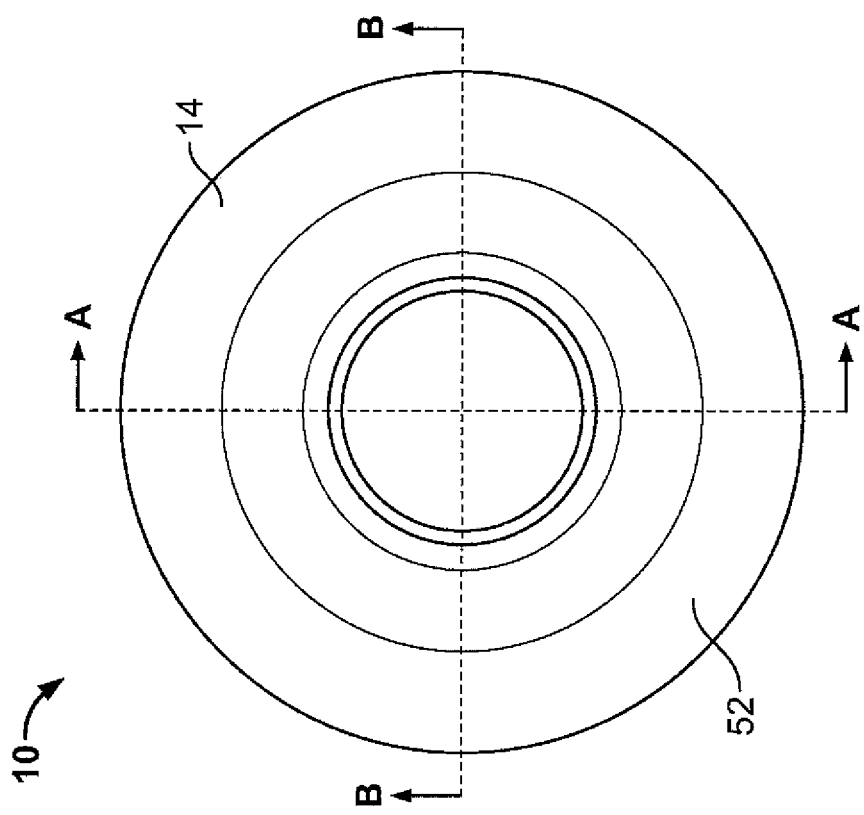
FIG. 2 is a top plan view of the liquid-tight strain relief shown in FIG. 1.
Figure 5:
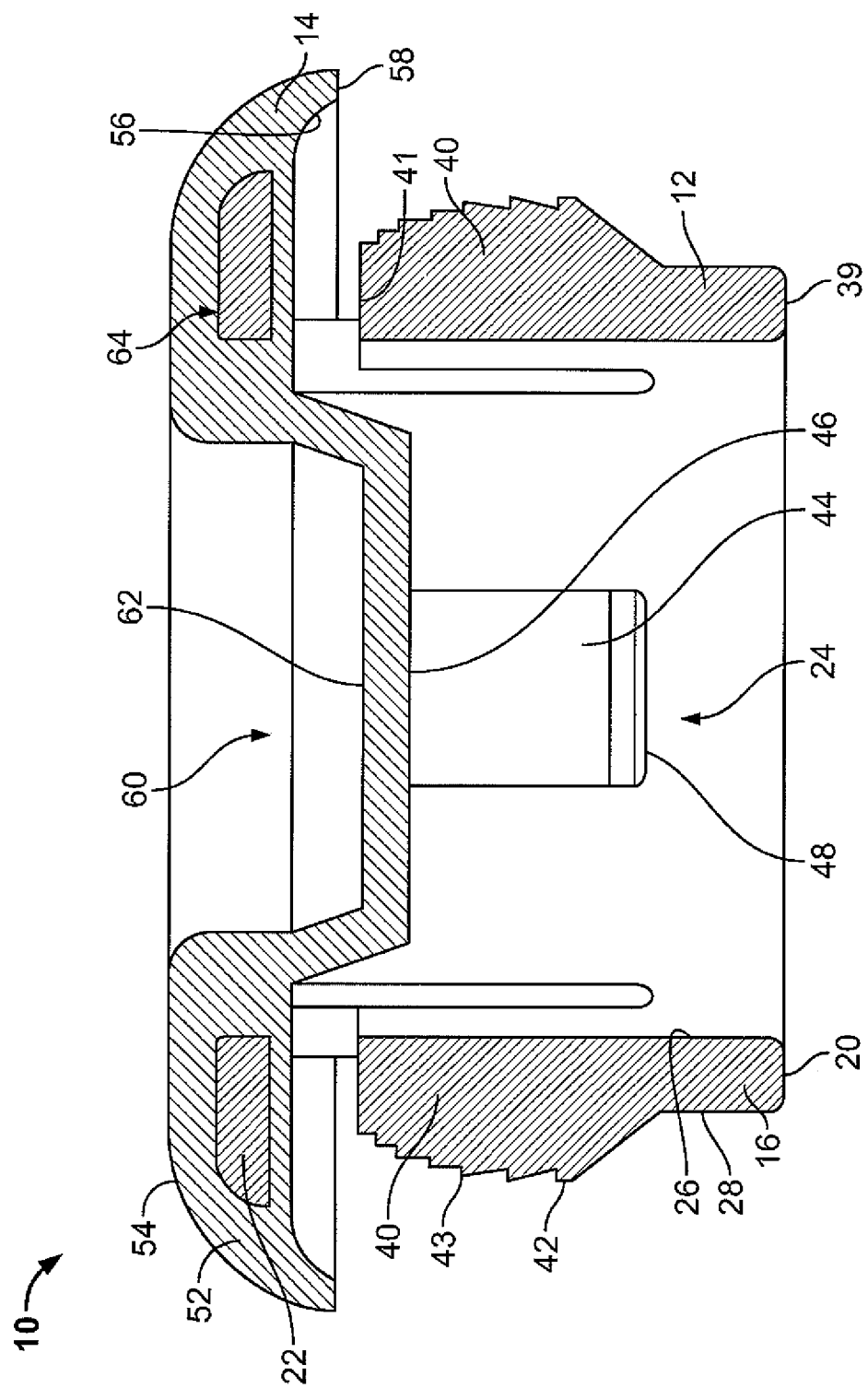
FIG. 5 is a side cross-sectional view, taken along lines A-A and looking in the direction of the arrows of the liquid-tight strain relief shown in FIG. 2.
Figure 6:
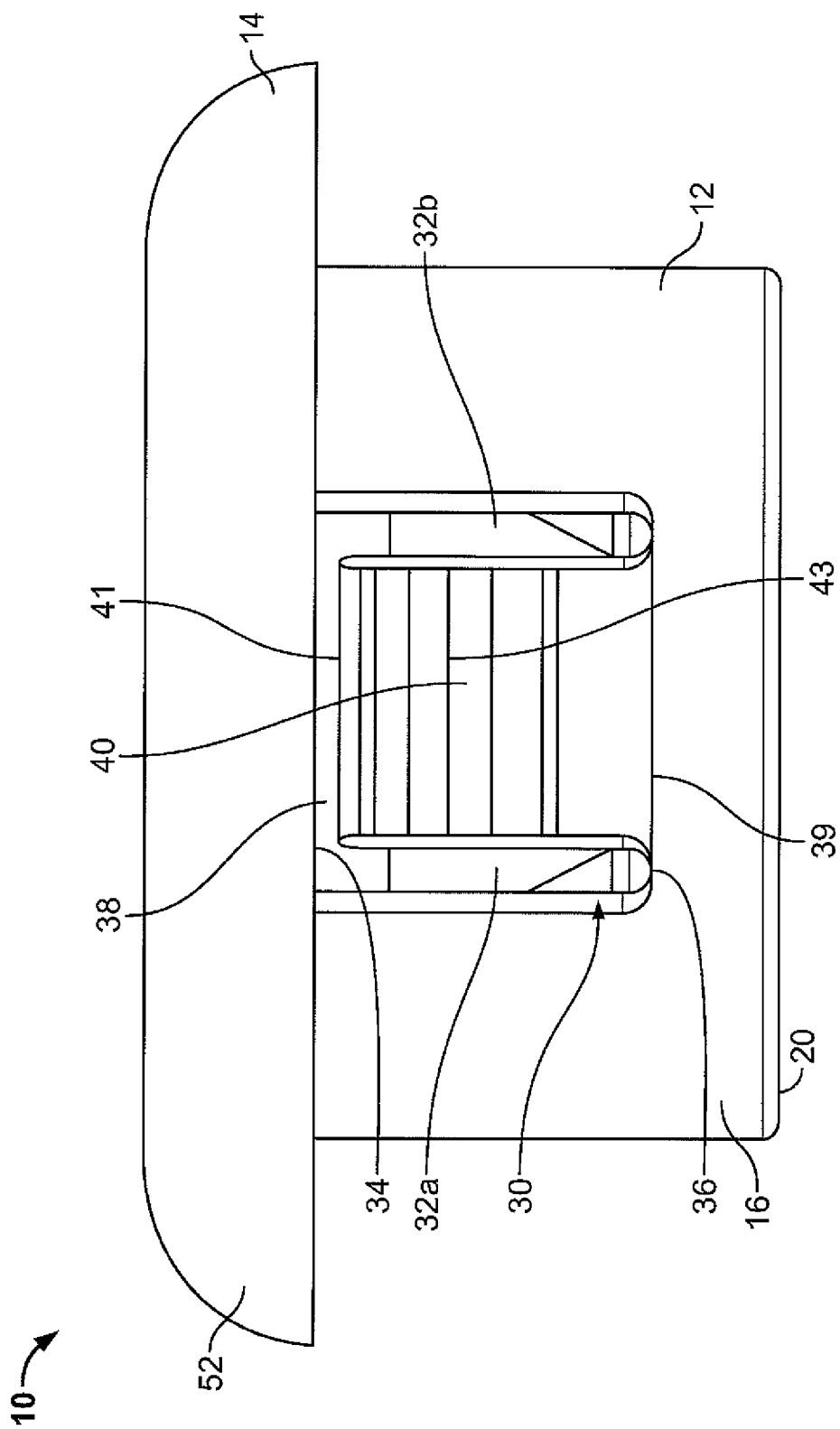
FIG. 6 is a side elevational view of the liquid-tight strain relief shown in FIG. 1.

With continued reference to FIGS. 1 through 7, in an embodiment, the bushing 12 includes a cylindrical-shaped housing 16 having a first end 18 and second end 20 opposite the first end 18, a peripheral flange 22 extending outwardly from the first end 18, and a centrally-located aperture 24 that extends from the first end 18 to the second end 20. The housing 16 of the bushing 12 further includes an inner wall 26, an outer wall 28, and a pair of diametrically opposed cutouts 30 extending from the inner wall 26 to the outer wall 28 (one of which is shown in FIG. 6). Each of the cutouts 30 includes a pair of spaced-apart and parallel, longitudinally extending slots 32a, 32b. Each of the slots 32a, 32b includes a first end 34 and second end 36 opposite the first end 34. The first ends 34 of each of the slots 32a, 32b are connected by a corresponding transverse slot 38. Each pair of the slots 32a, 32b and the corresponding transverse slot 38 define and surround a resilient outer finger 40. The outer finger 40 includes a first end 39 attached integrally to the housing 16, and an opposite free end 41. In an embodiment, the bushing 12 includes two of the outer fingers 40 that are diametrically opposed to one another. In other embodiments, the bushing 12 includes more or less than two of the outer fingers 40. Each of the outer fingers 40 includes an outer surface 42 having a plurality of elongated ribs 43 for frictional engagement with a work piece, which will be described hereinafter. In other embodiments, the outer surface 42 of the each of the outer fingers 40 may include other frictionally-engaging features known in the art.

Figure 7:
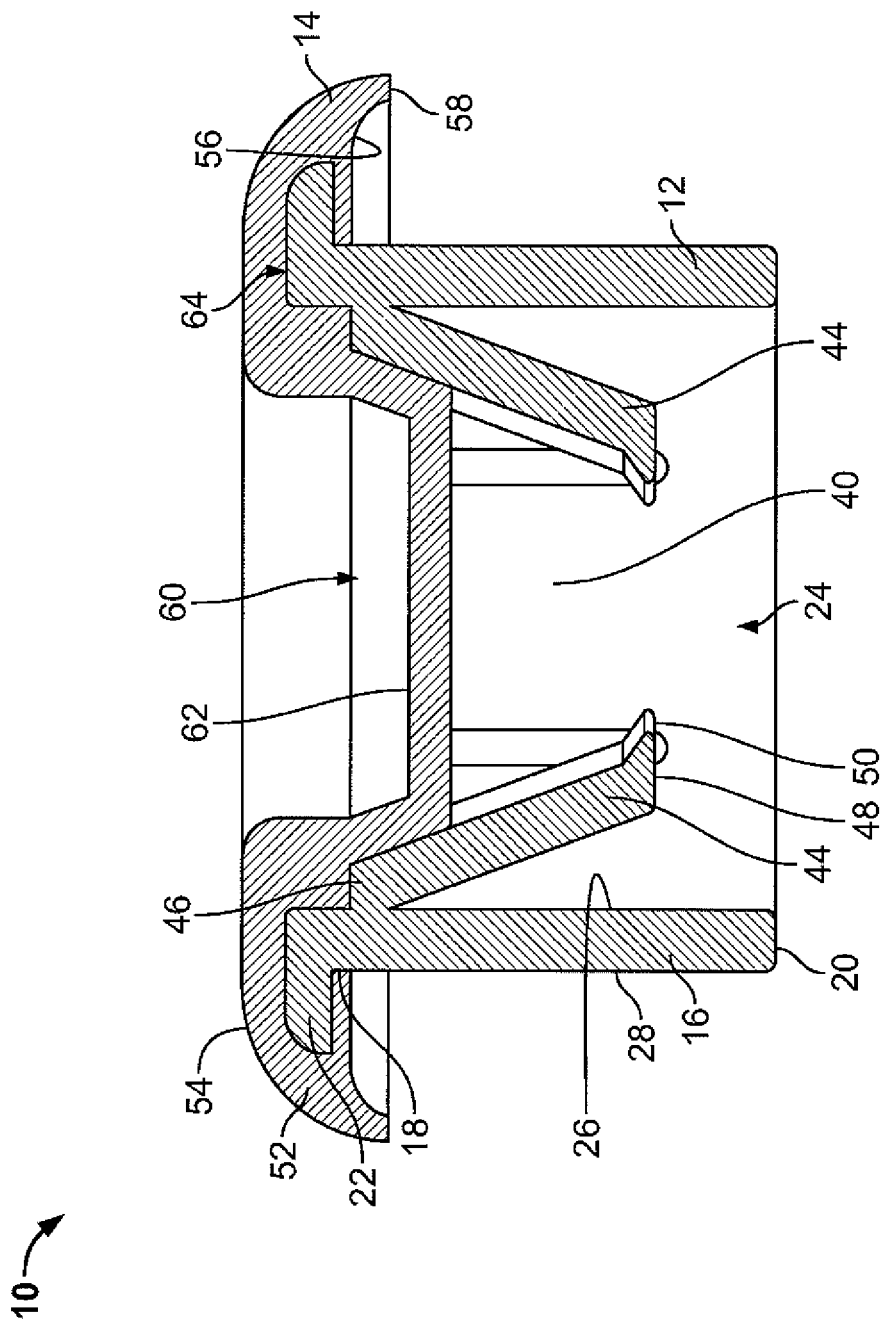
FIG. 7 is a side cross-sectional view, taken along lines B-B and looking in the direction of the arrows of the liquid-tight strain relief shown in FIG. 2.
Figure 13:
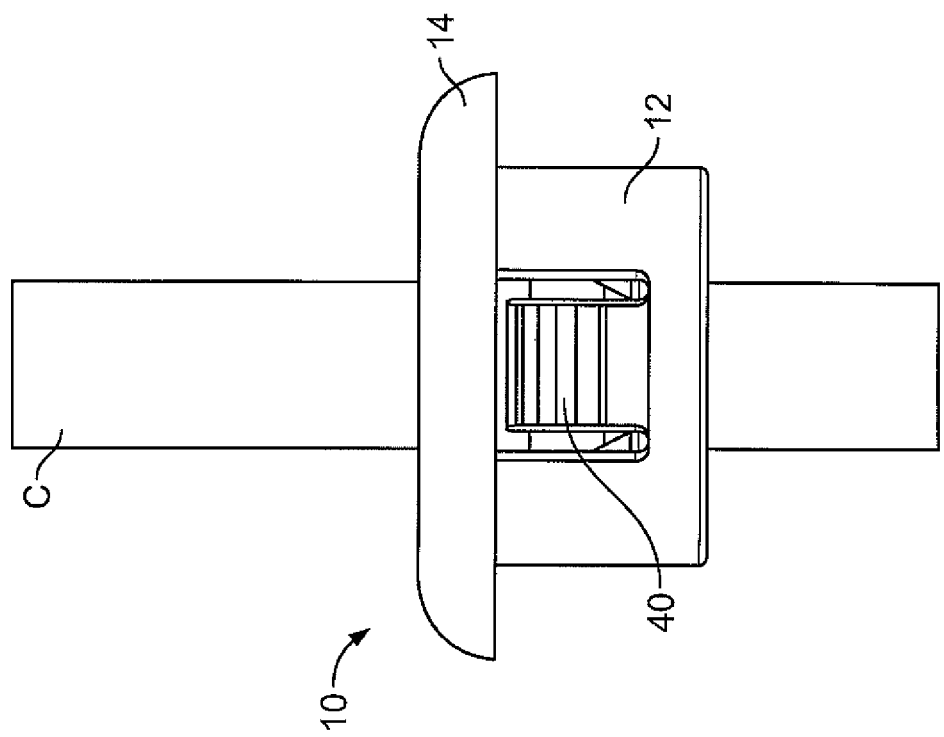
FIG. 13 is a side elevational view of the liquid-tight strain relief shown in FIG. 8.

Referring to FIGS. 5 and 7, in an embodiment, the bushing 12 includes a plurality of resilient inner fingers 44. Each of the inner fingers 44 includes a first end 46, which is attached to the inner wall 26 of the bushing 12 proximate to the first end 18 thereof, and a second, free end 48 opposite the first end 46, which is positioned within the aperture 24 of the bushing 12. In an embodiment, the first end 46 of each of the inner fingers 44 is integral with the inner wall 26. In an embodiment, each of the inner fingers 44 extends obliquely from the inner wall 26 of the bushing 12 within the aperture 24. In an embodiment, the second end 48 of each of the inner fingers 44 includes a pointed tip 50. It will be apparent to those of skill in the art that the plurality of resilient inner fingers 44 may include varying quantities of inner fingers 44. In an embodiment illustrated in FIG. 7, the bushing 12 includes two of the inner fingers 44 that are diametrically opposed to one another. In another embodiment, the bushing 12 includes three of the inner fingers 44. In another embodiment, the bushing 12 includes four of the inner fingers 44. In an embodiment illustrated in FIGS. 3, 13 and 14, the bushing 12 includes two of the inner fingers 44 that are diametrically opposed to one another and two of the outer fingers 40 that are diametrically opposed to one another, and a diameter defining the diametric opposition of the two inner fingers 44 is offset by a right angle from a diameter defining the diametric opposition of the two outer fingers 40.

Referring back to FIGS. 1 through 7, in an embodiment, the gland 14 includes a domed-shaped head 52 having a convex outer surface 54 and a concave inner surface 56, which meet to form an annular lip 58. A centrally-located, substantially circular-shaped depression 60 is formed within the outer surface 54 of the head 52, which culminates at a centrally-located membrane 62. In an embodiment, the membrane 62 includes a thickness that is sufficient for the membrane to be pierced, which will be described hereinafter. In an embodiment, the gland 14 is co-molded with the bushing 12 such that the flange 22 of the bushing 12 is encapsulated within an annular interior portion 64 of the head 52 of the gland 14. When the gland 14 is co-molded to the bushing 12, the membrane 62 resides within the aperture 24 of the bushing 12 proximate to the first end 18 of the bushing 12.

It will be known to those of skill in the art that when items are described as being "co-molded" to one another, reference is made to a fabrication process whereby items made of different materials are fabricated simultaneously within a single mold. For example, when the bushing 12 and the gland 14 of the exemplary liquid-tight strain relief 10 are described herein as being co-molded to one another, those of skill in the art will understand this description to mean that the bushing 12 and the gland 14 are made of different materials that are formed within the same mold at the same time. As discussed above, these materials may include a thermoplastic forming the bushing 12 and a thermoplastic elastomer (TPE) forming the gland 14.

In use, the liquid-tight strain relief 10 is sized and shaped to be affixed in a liquid-tight manner within an orifice of a work piece, such as a panel or other structure (not shown in the Figures). When the strain relief 10 is installed within the orifice in the work piece, the ribs 43 on the outer fingers 40 frictionally engage the work piece to facilitate the fixation of the strain relief 10 therein. In an embodiment, as the strain relief 10 is inserted into the orifice of the work piece, the ribs 43 are compressed to fit within the orifice. Once the strain relief 10 is secured within the orifice of the work piece, the annular lip 58 of the gland 14, which acts on the engaged surface of the work piece, forms a liquid-tight seal thereon.

Figure 8:
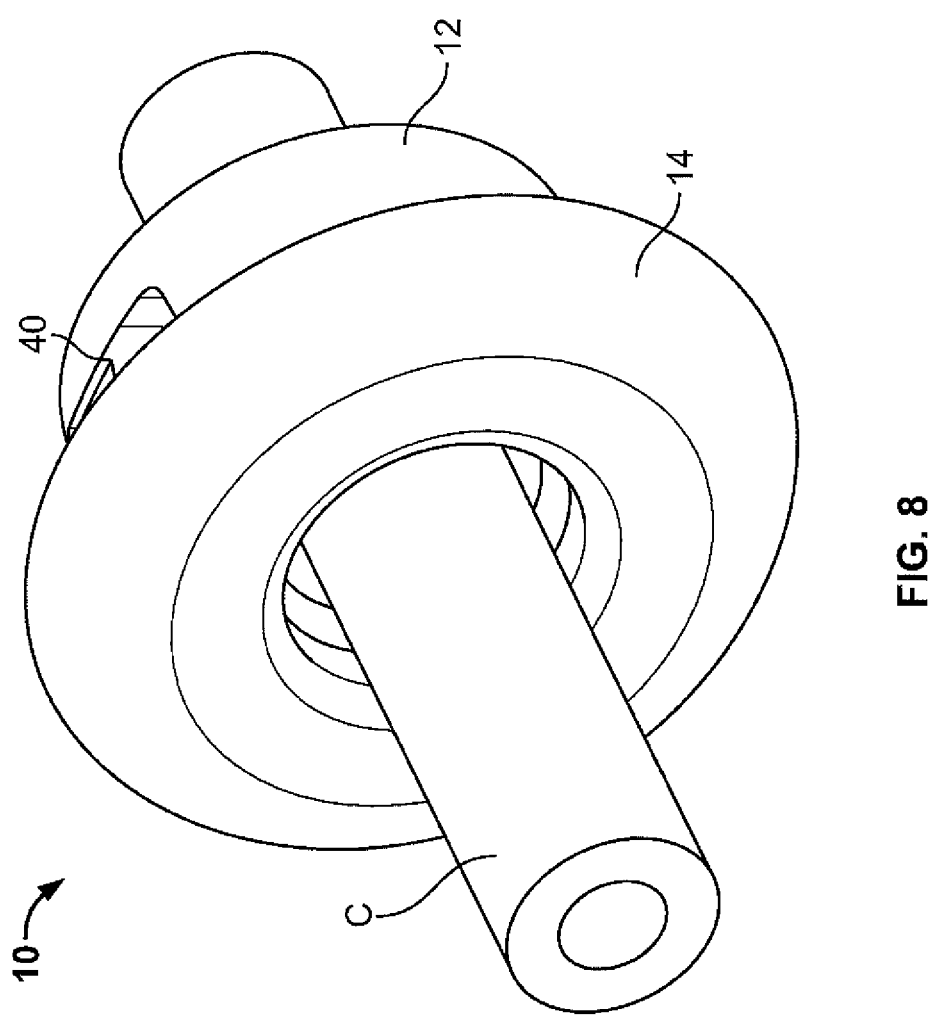
FIG. 8 is a top perspective view of the liquid-tight strain relief shown in FIG. 1 but with a cable positioned within it.
Figure 10:
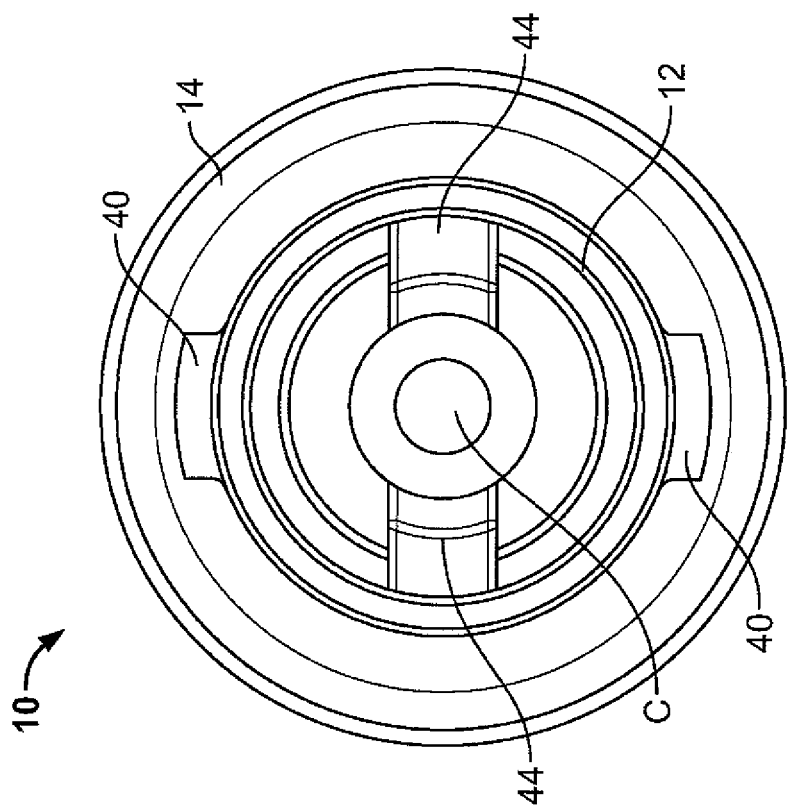
FIG. 10 is a bottom plan view of the liquid-tight strain relief shown in FIG. 8.
Figure 9:
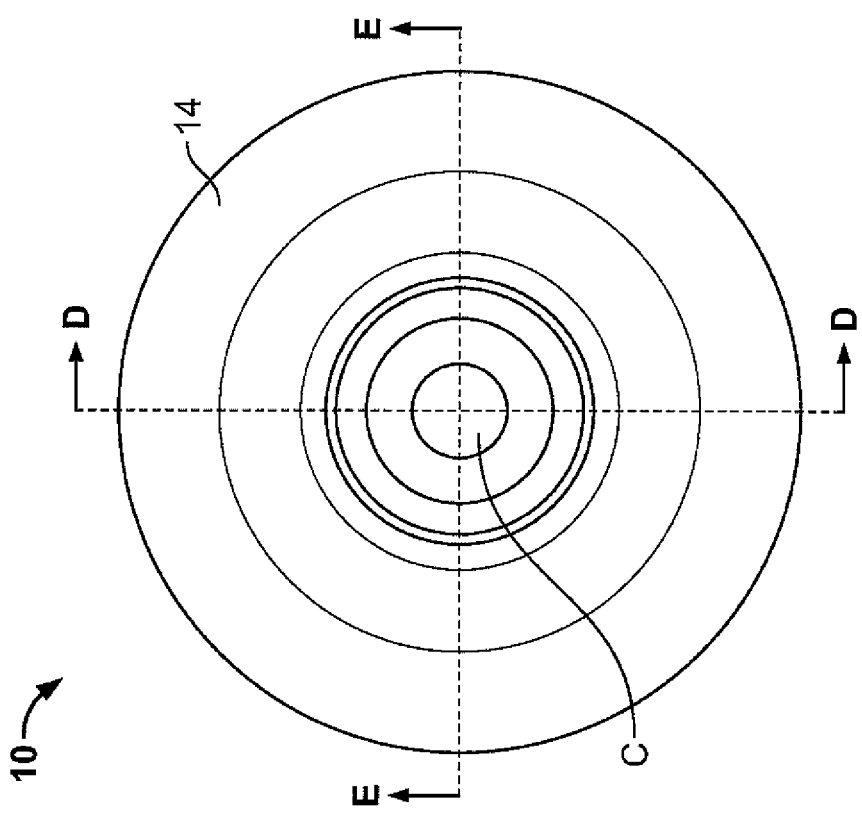
FIG. 9 is a top plan view of the liquid-tight strain relief shown in FIG. 8.
Figure 12:
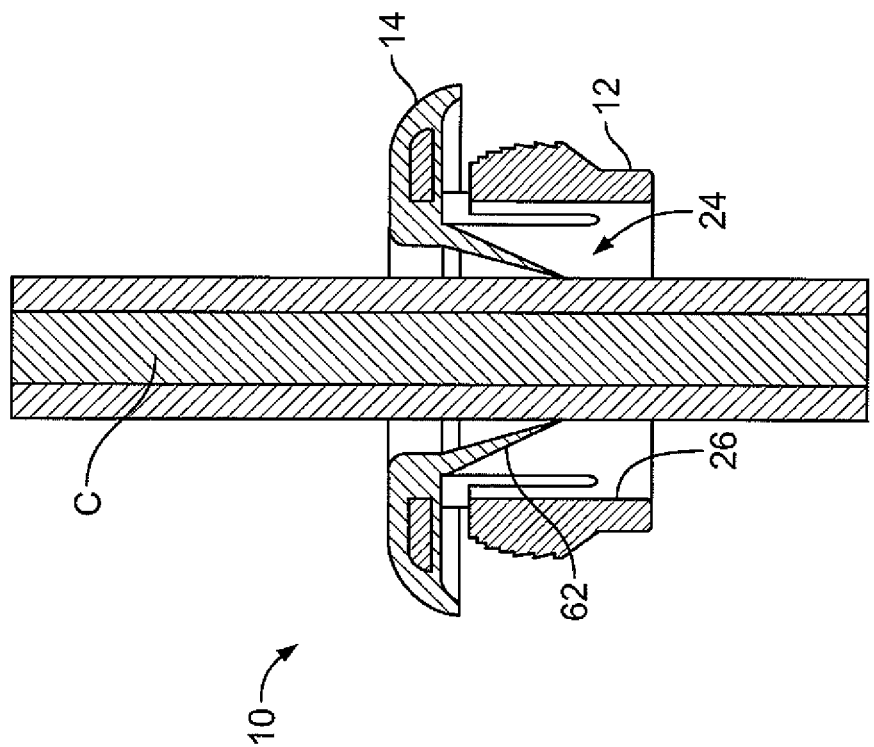
FIG. 12 is a side cross-sectional view, taken along lines D-D and looking in the direction of the arrows of the liquid-tight strain relief shown in FIG. 9.
Figure 11:
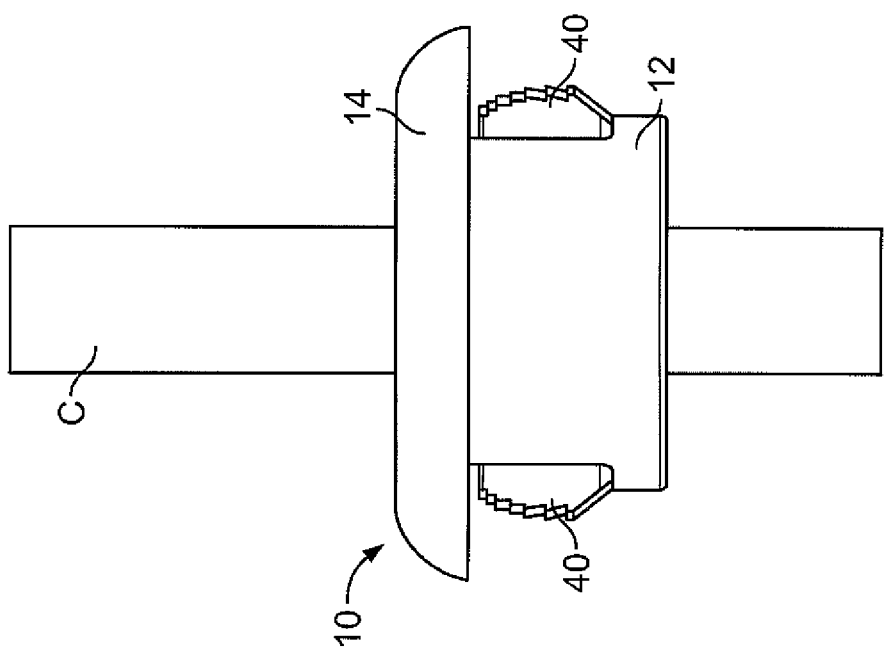
FIG. 11 is a side elevational view of the liquid-tight strain relief shown in FIG. 8.
Figure 14:
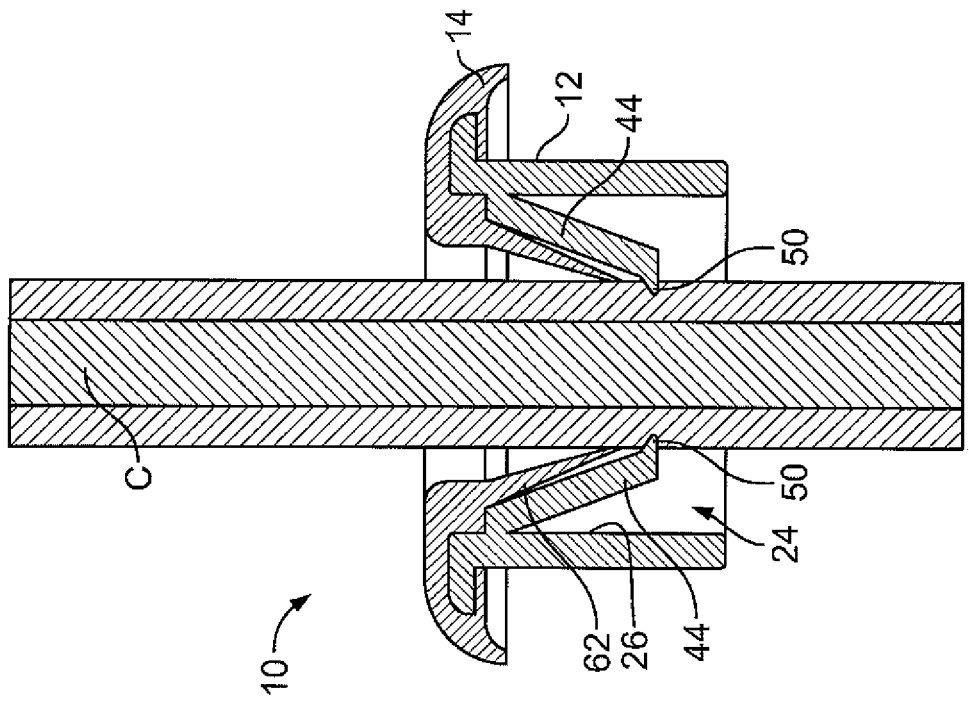
FIG. 14 is a side cross-sectional view, taken along lines E-E and looking in the direction of the arrows of the liquid-tight strain relief shown in FIG. 9.

Referring to FIGS. 8 through 14, when a cable C (or a wire, tubing, rod and other elongated object) is inserted in the strain relief 10, it pierces the membrane 62 of the gland 14 (see FIGS. 8, 12 and 14). In this regard, the membrane 62 stretches and forms a liquid-tight seal around the cable C. In another embodiment, the cable C may first be installed through the strain relief 10, after which the strain relief 10 may be engaged in position along the cable C and then affixed within the orifice of the work piece. When the cable C is further inserted through the aperture 24 of the bushing 12, the cable C engages the inner fingers 44 which flex to allow the cable C to be inserted there through. As a result of the resiliency of the inner fingers 44, they are movable outwardly towards the inner wall 26 of the bushing 12 from a first, disengaged position to a second, engaged position, in which the pointed tips 50 of the inner fingers 44 dig-in and clasp the outer surface of the cable C to provide strain relief (see FIGS. 12 and 14).

Figure 15:
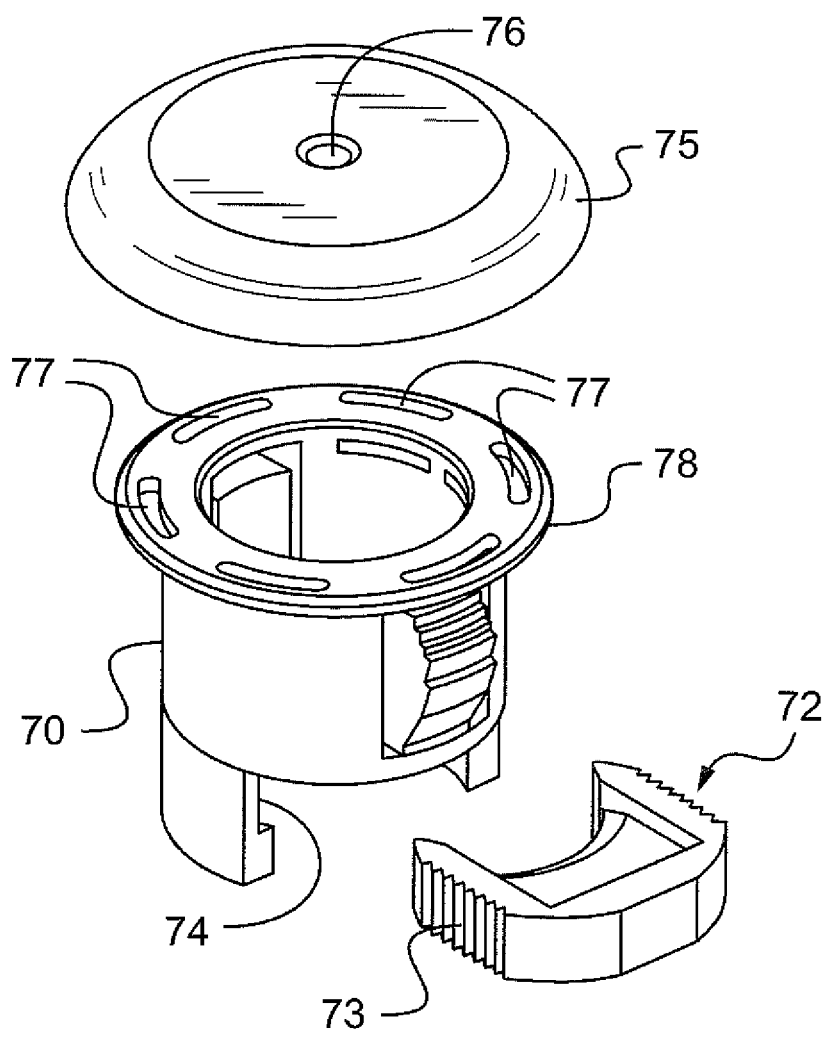
FIG. 15 is a top perspective exploded view of a liquid-tight strain relief constructed in accordance with an alternate embodiment of the invention.

Another preferred embodiment of the invention is shown in FIGS. 15 through 17. In this embodiment, the inner fingers are replaced by a manually operated shoe 72, which grips the cable "C" or other inserted object. Referring to FIG. 15, a shoe 72 is slideably received within a lateral recess 74 of the bushing 70, which has sidewalls and top and bottom surfaces that closely match the shoe dimensions. The shoe 72 has a series of teeth 63 on the exterior of its opposite sides. The flange 78 has a plurality of arcuate slots 77 that extend completely through the flange from a top side to the bottom side of the flange 68. The gland 75 has a central area of reduced thickness 76 to facilitate puncturing by an object such as a cable. Referring to FIG. 16, the gland 75 is co-molded with the bushing and during that process material of the gland encapsulates the flange 78 while passing through the slots 77 in the flange. Rotation of the gland 75 about the flange 78 is prevented by the gland material within the slots.

Engagement between the bushing 60 and the shoe 72 is depicted in FIG. 17. The teeth 73 on the shoe 72 engage the two diametrically-opposed locking ribs 71 projecting inwardly from the sides of the inner wall of the bushing 70. When the show 72 is manually pressed against a cable or other object (not shown) extending through the bushing, the cable becomes clamped between the shoe 72 and an arcuate portion of the bushing inner wall 79 opposite the shoe 72. The ratchet action of the teeth 73 against the ribs 71 secures the cable against the counteracting resilience of the cable and bushing components. The series of teeth 73 on the shoe 72 provides the adaptability of supplying a strong clamp force to cables or other objects of different diameters.

It should be understood that the embodiments described herein are merely exemplary and that a person skilled in the art may make many variations and modifications without departing from the spirit and scope of the invention. Accordingly, all such variations and modifications are intended to be included within the scope of the embodiments described herein as defined in the appended claims.

The invention claimed is:

1. A liquid-tight strain relief, comprising a bushing including a first end, a second end opposite said first end, an outer wall, an aperture extending from said first end to said second end and defining an inner wall, an annular flange extending radially outwardly from said first end, said at least one cutout extending from said outer wall to said inner wall, said at least one cutout defining at least one outer finger, said at least one outer finger adapted to frictionally engage an orifice of a work piece, a cable-gripping shoe slideably received within a lateral recess of the bushing; and a gland including a head having an outer surface, an inner surface, an annular interior portion located within said inner surface and encapsulating said annular flange of the bushing wherein the cable is clamped between the shoe and an arcuate portion of the bushing inner wall opposite the shoe and wherein said gland includes a depression of reduced thickness formed within said outer surface thereof and coaxial with said aperture of said bushing, said depression including a frangible membrane that is adapted to be punctured by an external object inserted into the bushing.

2. The liquid-tight strain relief of claim 1, wherein said at least one cutout includes a plurality of cutouts.

3. The liquid-tight strain relief of claim 2, wherein said plurality of cutouts includes two cutouts that are diametrically opposed to one another, and wherein said at least one outer finger includes two diametrically opposed outer fingers each of which is defined by a corresponding one of said two diametrically opposed cutouts.

4. The liquid-tight strain relief of claim 1, wherein said shoe is affixed to the bushing by the engagement of teeth on the outside of the shoe with at least one inward facing locking rib on the inner wall of the bushing.

5. The liquid-tight strain relief of claim 4, wherein said shoe is adapted to grip a cable received by the bushing by the application of manual force.

6. The liquid-tight strain relief of claim 1, wherein said bushing is made from a first material and said gland is made from a second material, said second material having a greater elasticity than said first material.

7. The liquid-tight strain relief of claim 6, wherein said first material is a thermoplastic material.

8. The liquid-tight strain relief of claim 7, wherein said second material is a thermoplastic elastomer.

9. The liquid-tight strain relief of claim 1, wherein frictionally engaging means of said at least one cutout includes a plurality of outwardly facing ribs.

10. The liquid-tight strain relief of claim 9, wherein said plurality of cutout ribs is compressible so that the liquid-tight strain relief is adapted to be positioned within the orifice of the work piece.

11. A liquid-tight strain relief, comprising a bushing including a first end, a second end opposite said first end, an outer wall, an aperture extending from said first end to said second end and defining an inner wall, an annular flange extending radially outwardly from said first end, said at least one cutout extending from said outer wall to said inner wall, said at least one cutout defining at least one outer finger, said at least one outer finger adapted to frictionally engage an orifice of a work piece, a cable-gripping shoe slideably received within a lateral recess of the bushing; and a gland including a head having an outer surface, an inner surface, an annular interior portion located within said inner surface and encapsulating said annular flange of the bushing wherein said gland includes a depression of reduced thickness formed within said outer surface thereof and coaxial with said aperture of said bushing, said depression including a frangible membrane that is adapted to be punctured by an external object inserted into the bushing.

12. The liquid-tight strain relief of claim 11, wherein the external object includes one of a cable, a wire, a tube, and a rod.

13. The liquid-tight strain relief of claim 12, wherein said membrane is adapted to form a liquid-tight seal around the external object after said membrane is punctured by the external object.

14. A liquid-tight strain relief, comprising a bushing including a first end, a second end opposite said first end, an outer wall, an aperture extending from said first end to said second end and defining an inner wall, an annular flange extending radially outwardly from said first end, said at least one cutout extending from said outer wall to said inner wall, said at least one cutout defining at least one outer finger, said at least one outer finger adapted to frictionally engage an orifice of a work piece, a cable-gripping shoe slideably received within a lateral recess of the bushing; and a gland including a head having an outer surface, an inner surface, an annular interior portion located within said inner surface and encapsulating said annular flange of the bushing wherein the flange has a plurality of arcuate slots extending through the flange from a top side to a bottom side thereof.

15. The liquid-tight strain relief of claim 1, 11 or 14 wherein the inner wall of the bushing has two diametrically opposed locking ribs that project from its inner wall which engage teeth on the exterior side surfaces of the shoe.

16. The liquid-tight strain relief of claim 1, 11 or 14 wherein said bushing and said gland are co-molded with one another.

17. The liquid-tight strain relief of claim 1, 11 or 14 wherein said at least one cutout of said bushing includes a pair of parallel, longitudinal slots, each of which includes a first end located proximate to said first end of said bushing and a second end located proximate to said second end of said bushing, and a transverse slot extending from said first end of one of said longitudinal slots to said first end of the other of said longitudinal slots.

18. The liquid-tight strain relief of claim 14 wherein portions of the gland extend through the slots to the bottom side of the flange thus encapsulating the flange in the area of the slots.

* * * * *